April 7, 1970 — L. O. VIRENO — 3,504,666
TEETH CLEANSING AND GUM MASSAGING DEVICE
Filed Aug. 9, 1967
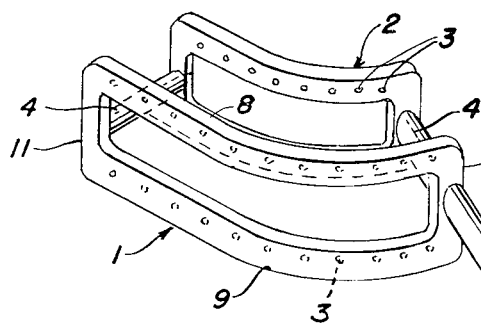
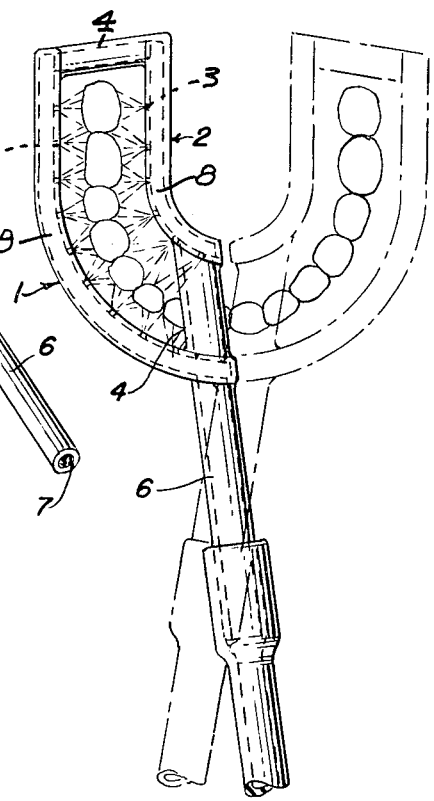
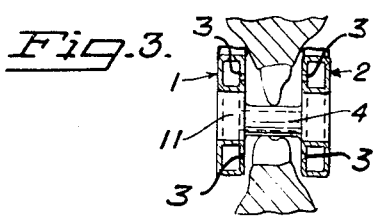
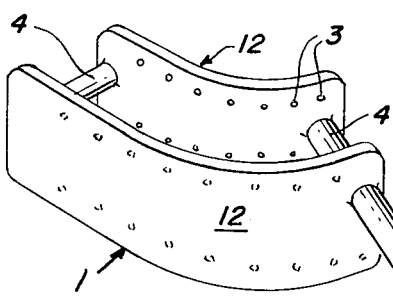
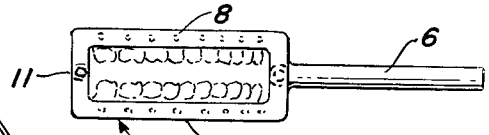
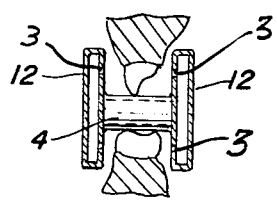
INVENTOR
LAWRENCE O. VIRENO
BY George B White
ATTORNEY United States Patent Office 3,504,666
Patented Apr. 7, 1970

3,504,666
TEETH CLEANING AND GUM
MASSAGING DEVICE
Lawrence O. Vireno, 139 Kinross Drive,
San Rafael, Calif. 94901
Filed Aug. 9, 1967, Ser. No. 659,498
Int. Cl. A61h 13/00
U.S. Cl. 128—66           2 Claims

ABSTRACT OF THE DISCLOSURE

A continuous tube formed by a pair of connected hollow or tubular frames. Each frame is of a rectangular form and is curved longitudinally to conform to about one-half of the arc of teeth and gums in the mouth. Two such parallel hollow or tubular frames are connected in the middle of each opposite end portions by a connecting tube so that the spaced parallel hollow or tubular frames form a continuous cavity to receive fluid under pressure. On the sides of the tubes or hollow members facing one another are a plurality of minute perforations for directing pressurized spray of fluid toward the dentition and the investing tissues with a cleansing and massaging action. The length and shape of the parallel hollow frames are such that each forms a half of the complete arc of the teeth in the mouth thereby to cover the teeth in about one-half of the mouth, both on the outside and also on the inside of the dentition, and to cover the upper and lower halves of the dentition on one side of the mouth simultaneously. A tubular handle is extended from the front end of the buccal hollow member in extension of the front connecting tube for the convenient manipulation of the device and to serve as an intake tube for the fluid. The lingual tube or hollow member is shorter than the buccal tube or hollow member to facilitate insertion and movement of the unit.

BRIEF DESCRIPTION OF THE INVENTION

The semi-arched parts of the parallel perforated tubes or hollow member straddle the upper and lower halves of the buccal and lingual sides of the dentition and are joined by two single connecting tubes at the opposite ends which connecting tubes are positioned between the teeth so that one of the elongated semi-arched tubular frames is between the lips and teeth forming buccal tubes directing fluid spray lingually of the mouth, and the other semi-arched elongated tubular frame is on the tongue side of the teeth and forms lingual tubes directing the spray buccally of the mouth, thereby the regulated necessary pressurized spray of water or suitable cleaning fluid strikes the teeth and gums with continuous pressurized cleansing and massaging on one side of the mouth; the cleanser can be inverted and used on the other side of the mouth; the spacing between the parallel tubular frames is such as to permit not only the shifting but also the rocking of and forward and backward motion of the cleaner thereby to direct the cleansing spray in various directions against the gums and the teeth.

DESCRIPTION OF FIGURES

FIG. 1 is a perspective view of the device.
FIG. 2 is a top plan view of the device in the mouth.
FIG. 3 is a cross-sectional view of the device.
FIG. 4 is a perspective view of a modified form of the device.
FIG. 5 is a plan view of the modified form.
FIG. 6 is a cross-sectional view of the modified form.

DETAILED DESCRIPTION

In the device there is a buccal sprayer 1 and lingual sprayer 2 each provided with minute perforations 3 facing toward the opposite member. The buccal sprayer 1 and the lingual sprayer 2 are spaced apart by spacing and connecting tubes 4 at the opposite ends thereof at such distance as to space the sprayers from the opposite sides of the teeth and gums in the mouth to allow shifting and rocking of the sprayers for changing the directions of the cleansing spray issuing from the nozzle perforations 3. A handle tube 6 is connected to the front end of the buccal sprayer 1 in extension of the front connecting tube 4 and is slanted at such an angle as to extend outwardly between the lips and serve as a handle. The free end of the handle tube 6 is provided with suitable threads 7, or the like, for connection to a hose or the like fluid supply.

Each sprayer 1 and 2 is arched or curved longitudinally to conform to about one-half of the arc of the curvature of the mouth, thereby straddle and cover the teeth and gums in one-half of the mouth. The lingual sprayer 2 is shorter than the buccal sprayer 1 so that the connecting tubes 4 converge toward the lingual sprayer 2.

The top and bottom edges or sides of each sprayer are also dished or curved transversely or vertically with respect to the plane of the sprayer substantially to conform the top and bottom edges thereof to the curvature of the tissues in the mouth about the gums.

In the first illustrative embodiment each sprayer is a tubular frame having longitudinal sides 8 and 9 and connecting ends 11 forming a continuous passage. The longitudinal sides 8 and 9 are bent longitudinally into a half arc relatively to the arc of the mouth. The buccal sprayer is concavo-convex and the lingual sprayer is parallel and also concavo-convex. The concave face of the buccal sprayer faces the buccal surfaces of the teeth, and the convex side of the lingual sprayer faces toward the lingual surfaces of the teeth. The connecting tubes 4 are between the ends 11 of the tubular frames. Each sprayer is also curved transversely, namely, the longitudinal edges formed by the longitudinal sides 8 and 9 are curved transversely of the plane of the sprayer to form a concave top edge and convex bottom edge on each sprayer.

In the event the buccal sprayer and lingual sprayer are made out of hollow bodies 12 as shown in FIG. 4, instead of out of a tubular frame, then the shaping and curving is the same as heretofore described, but perforations then are arranged on the facing areas or faces of the opposite hollow plates or bodies 12.

In operation the end 7 of the handle tube 6 is connected by hose or the like to liquid supply, and then the device is placed in the mouth so that the connecting tubes 4 are between the teeth and the device straddles both the upper and lower teeth and gums. Then the water is turned on and the device is rocked and shifted to direct the spray in various directions on the opposite sides of the teeth and gums. The devices is then inverted upside down and is inserted over the teeth on the other half of the mouth and the operation is continued. This creates a thorough and proper cleansing of the dentition and also massaging of their investing tissues, yet requiring the minimum know-how of the average user.

I claim:

1. A teeth cleaning and gum massaging device comprising
    (a) spaced parallel hollow elements curved longitudinally to conform to the curvature of teeth and gums in the mouth,
    (b) means at each end of said elements to connect and space said elements in predetermined relation, so that said parallel hollow elements loosely straddle the upper and lower teeth and gum, (c) said parallel elements having spraying means on their facing and sides, spraying toward each other and toward the teeth and gum therebetween, (d) and means to conduct fluid under pressure into said hollow elements, (e) one of said hollow elements being a longitudinally concavo-convex buccal sprayer, (f) the other of said hollow elements being a longitudinally concavo-convex lingual sprayer, the convex face thereof facing toward the concave face of the buccal sprayer, (g) said spraying means being respectively on the concave face of the buccal sprayer and on the convex face of the lingual sprayer, (h) said lingual sprayer being shorter than said buccal sprayer, (i) said connecting and spacing means being between the opposite ends of said buccal sprayer and said lingual sprayer and converging toward the lingual sprayer, (j) said connecting and spacing means being about the middle of said opposite ends to render said spaced hollow elements invertible to opposite sides of the mouth.

2. The invention defined in claim 1, and (i) said fluid conducting means including a handle tube connected to an end of the buccal sprayer substantially in registry with the adjacent connecting means, (j) and said connecting means being hollow to conduct fluid into said hollow elements.

References Cited

UNITED STATES PATENTS

| | | |
|---|---|---|
| 1,646,942 | 10/1927 | Tuorto. |
| 1,500,107 | 7/1924 | Chandler. |
| 2,672,143 | 3/1954 | Gold et al. _____ 128—239 |
| 3,211,149 | 10/1965 | Fono. |

LAURENCE W. TRAPP, Assistant Examiner

U.S. Cl. X.R.

128—239